(12) United States Patent
Sasaki et al.

(10) Patent No.: US 11,446,845 B2
(45) Date of Patent: Sep. 20, 2022

(54) METHOD FOR MANUFACTURING FRP PRECURSOR AND METHOD FOR MANUFACTURING FRP

(71) Applicant: HITACHI CHEMICAL COMPANY, LTD., Tokyo (JP)

(72) Inventors: Ryohta Sasaki, Tokyo (JP); Yukio Nakamura, Tokyo (JP); Kazutoshi Danjoubara, Tokyo (JP); Takeshi Saitoh, Tokyo (JP); Shintaro Hashimoto, Tokyo (JP)

(73) Assignee: Showa Denko Materials Co., Ltd., Tokyo (JP)

( * ) Notice: Subject to any disclaimer, the term of this patent is extended or adjusted under 35 U.S.C. 154(b) by 144 days.

(21) Appl. No.: 16/497,127

(22) PCT Filed: Mar. 28, 2018

(86) PCT No.: PCT/JP2018/012843
§ 371 (c)(1),
(2) Date: Sep. 24, 2019

(87) PCT Pub. No.: WO2018/181513
PCT Pub. Date: Oct. 4, 2018

(65) Prior Publication Data
US 2020/0376715 A1   Dec. 3, 2020

(30) Foreign Application Priority Data
Mar. 28, 2017 (JP) .............................. JP2017-063975

(51) Int. Cl.
*B29B 11/12* (2006.01)
*B29B 11/16* (2006.01)
(Continued)

(52) U.S. Cl.
CPC .............. *B29B 11/12* (2013.01); *B29B 11/16* (2013.01); *B29C 70/06* (2013.01); *B29C 70/504* (2013.01); *B29K 2101/10* (2013.01)

(58) Field of Classification Search
CPC ......... B29B 11/04; B29B 11/12; B29B 11/16; B29B 15/12; B29B 15/14; B29C 70/06;
(Continued)

(56) References Cited

U.S. PATENT DOCUMENTS

2009/0126974 A1   5/2009  Yuasa et al.
2016/0263776 A1   9/2016  Humfeld
(Continued)

FOREIGN PATENT DOCUMENTS

CN     1823557 A    8/2006
CN   101774281 A    7/2010
(Continued)

*Primary Examiner* — Michael A Tolin
(74) *Attorney, Agent, or Firm* — Fitch, Even, Tabin & Flannery, LLP

(57) ABSTRACT

In the method for adhering a resin film with an aggregate under an atmospheric pressure in which workability is excellent and spouting of the resin from an edge portion of the aggregate can be suppressed, the present invention provides a method for producing an FRP precursor with excellent resin filling property into bulk voids of the aggregate as well as a method for producing an FRP. Specifically, provided is the method for producing the FRP precursor by adhering a thermosetting resin film to one surface of an aggregate that is in a form of a sheet under an atmospheric pressure, wherein the method includes a process in which the thermosetting resin film and the aggregate are press-adhered by heating by means of a pressure roll having a temperature in a range of +5° C. to +35° C. relative to a temperature at which a minimum melt viscosity of the film is exhibited.

4 Claims, 1 Drawing Sheet

(51) Int. Cl.
*B29C 70/06* (2006.01)
*B29C 70/50* (2006.01)
*B29K 101/10* (2006.01)

(58) Field of Classification Search
CPC ..... B29C 70/50; B29C 70/504; B29C 70/506; B29K 2101/10; C08J 5/24
See application file for complete search history.

(56) References Cited

U.S. PATENT DOCUMENTS

| | | |
|---|---|---|
| 2018/0142057 A1 | 5/2018 | Oota et al. |
| 2018/0345539 A1 | 12/2018 | Tosaka et al. |
| 2018/0345540 A1 | 12/2018 | Tosaka et al. |

FOREIGN PATENT DOCUMENTS

| | | | | |
|---|---|---|---|---|
| CN | 102952327 A | 3/2013 | | |
| CN | 103958142 A | 7/2014 | | |
| CN | 203957466 U | 11/2014 | | |
| CN | 106273060 A | 1/2017 | | |
| JP | H01-272416 A | 10/1989 | | |
| JP | 2011-132535 A | 7/2011 | | |
| JP | 2013-209626 A | 10/2013 | | |
| JP | 2013209626 A * | 10/2013 | ............. | B32B 27/38 |
| JP | 2016-138205 A | 8/2016 | | |
| JP | 2016138205 A * | 8/2016 | | |
| TW | 201343740 A | 11/2013 | | |
| WO | 2016/178399 A1 | 11/2016 | | |
| WO | 2016/178400 A1 | 11/2016 | | |
| WO | 2016/182077 A1 | 11/2016 | | |

* cited by examiner

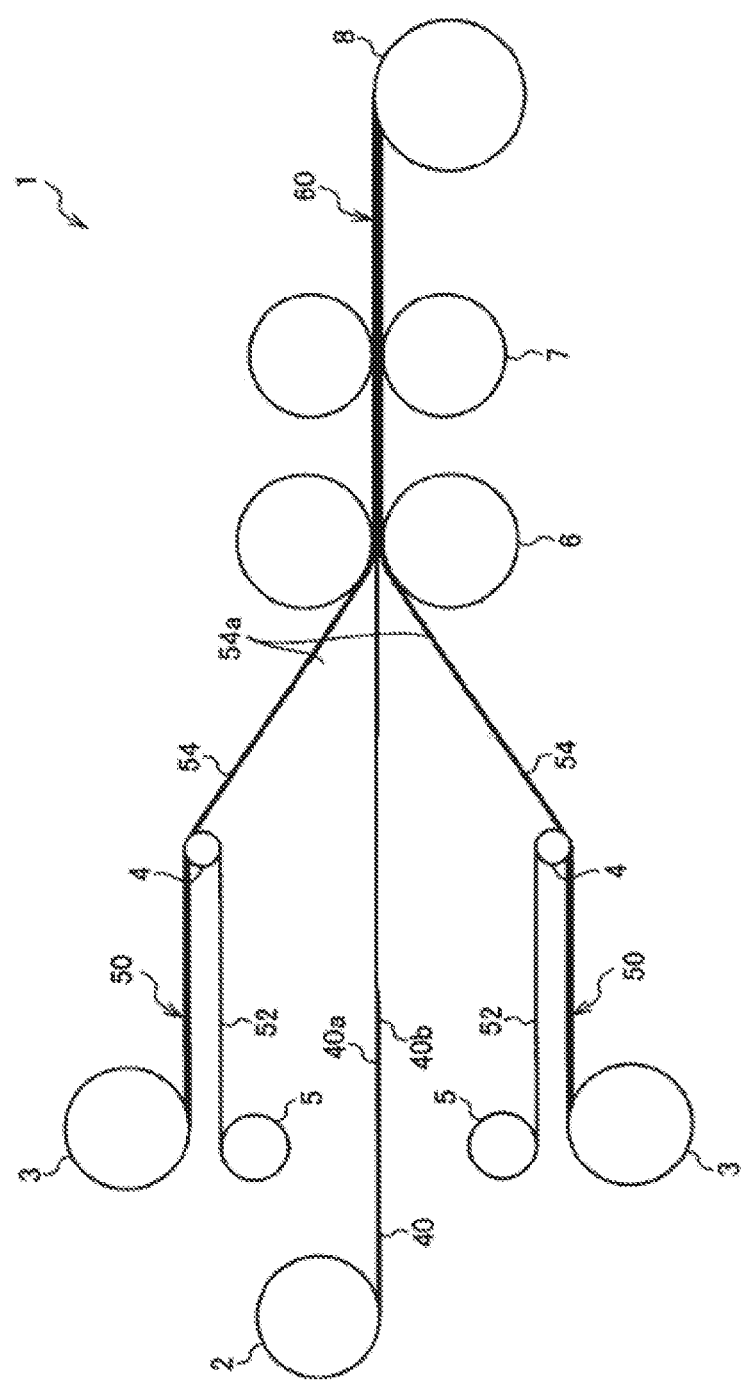

METHOD FOR MANUFACTURING FRP PRECURSOR AND METHOD FOR MANUFACTURING FRP

CROSS-REFERENCE TO RELATED APPLICATIONS

This application is a U.S. national phase application filed under 35 U.S.C. § 371 of International Application No. PCT/JP2018/012843, filed Mar. 28, 2018, designating the United States, which claims priority from Japanese Patent Application No.: 2017-063975, filed Mar. 28, 2017, which are hereby incorporated herein by reference in their entirety.

TECHNICAL FIELD

The present invention relates to a method for producing an FRP precursor as well as a method for producing an FRP.

BACKGROUND ART

FRP (Fiber Reinforced Plastics) is a composite material using an aggregate having a high modulus, such as fibers, in which the aggregate is incorporated into a mother material (matrix) such as a plastic in order to enhance the strength thereof. Therefore, FRP is a cheap, light, and highly durable composite material utilizing its weatherability, lightness, and resistances to heat and chemicals.

By utilizing these characteristics, FRP is used in a wide field. For example, the FRP is used in a wide field such as structural materials of housing equipment, marine vessels, vehicles, and airplanes because the FRP can be molded and has high strength, as well as in a field such as an electric device because of its electric non-conductance. As for the FRP used in the electronic device, a prepreg may be cited. The FRP before being cured such as the prepreg is also especially called an FRP precursor.

Illustrative examples of the FRP production method include: (1) an RTM (Resin Transfer Molding) method in which a resin is charged into a matched mold having an aggregate spread therein; (2) a Hand Lay-up (HLU) method and a spray-up method in which with defoaming a resin the resin is laminated in a multiple fashion onto a spread aggregate; and (3) an SMC (Sheet Molding Compound) press method in which an aggregate and a resin are pre-mixed and made to a form of a sheet, and then this is press-molded in a mold.

When the FRP is used for a printed wiring board, thickness of the FRP for the printed wiring board is required to be thinner than the thickness of the FRP for other uses. In addition, the FRP for the printed wiring board is required to have a high quality specification, such as absence of a void and a narrow acceptable range of variance in its thickness after FRP molding.

Accordingly, many FRPs for the printed wiring board are produced by the Hand Lay-up (HLU) method. The Hand Lay-up method is the production method in which a varnish having a resin dissolved therein is applied to an aggregate by using a coating machine, which is then followed by drying it so as to remove a solvent and cure it by heating (see PTL 1). In the Hand Lay-up method, if a thermosetting resin is applied to the aggregate in advance, the workability in the process can be improved and the load to a surrounding environment can be lowered.

However, when an aggregate such as an aramid nonwoven fabric without a calendar treatment, a thin glass paper, or a thin woven fabric is used, they are low in the strength as the aggregate; and thus, upon applying the varnish followed by solvent removal, drying, and thermal curing, the weight thereof outweighs the allowable load of the aggregate thereby resulting in a cut of the aggregate and a poor workability such as a breakage of the aggregate upon narrowing a gap of the coater so as to control the amount of the resin to be applied.

In addition, the FRP for a printed wiring board needs to satisfy both a high accuracy of the thickness after lamination and a filling property (moldability) of the resin into an inner layer circuit pattern. Therefore, it is necessary to produce the FRP precursors having different amounts of the resin attached to the aggregate with the difference of several percentages by mass, the FRP precursors having different curing times of the thermosetting resin, the FRP precursors obtained from combination of them, and the like; and thus, plural FRP precursors need to be produced from one aggregate so that the production conditions thereof are cumbersome. Moreover, because each of these FRP precursors is produced by different coating condition, loss of the material used in the production thereof is significant.

Accordingly, a method for producing the FRP precursor is proposed, the method having a process in which the thermosetting resin is not applied directly to the aggregate, but the thermosetting resin is previously made to a resin film in a form of a film; and then, after this resin film and the aggregate are adhered under a reduced pressure, they are subjected to a heat treatment (see PTL 2).

CITATION LIST

Patent Literature

PTL 1: Japanese Patent Laid-Open Publication No. H01-272416
PTL 2: Japanese Patent Laid-Open Publication No. 2011-132535

SUMMARY OF INVENTION

Technical Problem

However, in the method described in PTL 2, when the aggregate and the resin film are adhered under a reduced pressure, not only a trouble cannot be readily dealt with when it occurs, but also spouting of the resin from an edge portion of the aggregate needs to be dealt with. In addition, efficiencies such as workability are inherently poor under a reduced pressure.

Accordingly, in order to avoid the problems described above, a method in which the aggregate and the resin films are adhered under an atmospheric pressure may be conceived. However, according to the investigation of the inventors of the present invention, when the adhesion was merely carried out under an atmospheric pressure, it was found that the resin filling property into the aggregate was so poor that voids were sometimes formed.

Therefore, in the method for adhering the resin film with the aggregate under an atmospheric pressure in which workability is excellent and spouting of the resin from an edge portion of the aggregate can be suppressed, the present invention intends to provide a method for producing an FRP precursor having an excellent resin filling property into bulk voids of the aggregate as well as a method for producing an FRP.

Solution to Problem

The inventors of the present invention carried out an extensive investigation to solve the problems described above; and as a result, it was found that when a resin film was adhered with an aggregate under an atmospheric pressure followed by press-adhering them by using a roll under specific conditions, these problems could be solved thereby resulting in accomplishment of the present invention. The present invention could be completed on the basis of this finding.

The present invention relates to following [1] to [7],

[1] A method for producing an FRP precursor, wherein
the method is to produce the FRP precursor by adhering a thermosetting resin film to one surface of an aggregate that is in a form of a sheet under an atmospheric pressure, and
the method includes a process in which the thermosetting resin film and the aggregate are press-adhered by heating by means of a pressure roll having a temperature in a range of +5° C. to +35° C. relative to a temperature at which a minimum melt viscosity of the film is exhibited.

[2] The method for producing the FRP precursor according to [1], wherein a roll linear pressure of the pressure roll is in a range of 0.2 to 1.0 MPa.

[3] The method for producing the FRP precursor according to [1] or [2], wherein a roll linear pressure of the pressure roll is in a range of 0.4 to 1.0 MPa.

[4] A method for producing an FRP, wherein the method includes a process in which the FRP precursor obtained by the production method according to any one of [1] to [3] is cured.

[5] A method for producing an FRP precursor, wherein
the method is to produce the FRP precursor by adhering a thermosetting resin film to one surface of an aggregate that is in a form of a sheet under an atmospheric pressure, and
the method includes a process in which the film and the aggregate are press-adhered by heating by means of a pressure roll with a roll linear pressure of 0.4 to 1.0 MPa.

[6] The method for producing the FRP precursor according to [5], wherein a temperature owned by the pressure roll is lower than +5° C. of a temperature at which a minimum melt viscosity of the thermosetting resin film is exhibited.

[7] A method for producing an FRP, wherein the method includes a process in which the FRP precursor obtained by the production method according to [5] or [6] is cured.

Advantageous Effects of Invention

According to the present invention, provided are: a method for producing an FRP precursor having an excellent resin filling property into bulk voids of an aggregate wherein workability of the method is excellent and spouting of the resin from an edge portion of the aggregate can be suppressed; and a method for producing an FRP.

BRIEF DESCRIPTION OF DRAWINGS

FIG. 1 is a conceptual diagram illustrating one aspect of the method for producing the FRP precursor according to the present invention.

DESCRIPTION OF EMBODIMENTS

[Method for Producing the FRP Precursor]

One aspect of the present invention is a method for producing an FRP precursor, wherein
the method is to produce the FRP precursor by adhering a thermosetting resin film (hereinafter, this is sometimes called a resin film) to one surface of an aggregate that is in a form of a sheet under an atmospheric pressure, and
the method includes a process in which the thermosetting resin film and the aggregate are press-adhered by heating by means of a pressure roll having a temperature in a range of +5° C. to +35° C. relative to a temperature at which a minimum melt viscosity of the film is exhibited.

Other aspect of the present invention is a method for producing an FRP precursor, wherein
the method is to produce the FRP precursor by adhering a thermosetting resin film to one surface of an aggregate that is in a form of a sheet under an atmospheric pressure, and
the method includes a process in which the film and the aggregate are press-adhered by heating by means of a pressure roll with a roll linear pressure of 0.4 to 1.0 MPa.

Hereinafter, with referring to FIG. 1, explanation will be made about the embodiments according to the present invention with regard to the method for producing the FRP precursor and the FRP precursor production device 1 that can be used in this production method. Here, the FRP precursor production device 1 will be explained as the device to adhere each of a pair of resin films (thermosetting resin films) 54 to both surfaces of the aggregate 40 in a form of a sheet; however, the device may also be the one in which one resin film 54 is adhered to only one surface of the aggregate 40 in a form of a sheet. In this case, one resin film send-out device 3, one protection film peel-off mechanism 4, and one protection film roll-up device 5, all of which are disposed in a lower side (or in a upper side) of the aggregate 40 in FIG. 1, are not necessary.

The FRP precursor production device 1 is placed under an atmospheric pressure. The FRP precursor production method according to the present invention can be conducted by using the FRP precursor production device 1. Note that, in this specification, "under an atmospheric pressure" is the same meaning as "under a normal pressure". In the case where the FRP precursor is produced under an atmospheric pressure, a problem of poor workability that readily occurs, for example, when a vacuum laminator or the like is used, can be avoided.

The FRP precursor production device 1 is provided with the aggregate send-out device 2, a pair of the resin film send-out devices 3 and 3, the sheet heating and press-adhering device 6, and the FRP precursor roll-up device 8. Preferably, the FRP precursor production device 1 is further provided with the sheet pressing and cooling device 7, a pair of the protection film peel-off mechanisms 4 and 4, and a pair of the protection film roll-up devices 5 and 5.

The aggregate send-out device 2 is the device in which a roll to which the aggregate 40 in a form of a sheet is rolled up is rotated to a direction opposite to a roll-up direction thereby sending out the aggregate 40 that is rolled up in a roll. In FIG. 1, the aggregate send-out device 2 sends out the aggregate 40 from a lower side of the roll toward the sheet heating and press-adhering device 6.

Each of the pair of the resin film send-out devices 3 and 3 has a roll to which a protection-film-attached resin film 50 is rolled up and a supporting mechanism to rotatably support the roll with imparting a prescribed tension to the protection-film-attached resin film 50 that is sent out from the roll, wherein the roll to which the protection-film-attached resin film 50 is rolled up is rotated to a direction opposite to a roll-up direction thereof so as to send out the protection-film-attached resin film 50 that is rolled up to the roll. The protection-film-attached resin film 50 is a film in a form of a sheet including a resin film 54 and a protection film 52 that is laminated to an aggregate-side film surface (of both surfaces of the resin film 54, the surface in the side of the aggregate 40) 54a, which is one surface of the resin film 54.

Each of the pair of the resin film send-out devices 3 and 3 is located in a side of a front surface 40a and a side of a back surface 40b of the sent-out aggregate 40, respectively.

The one resin film send-out device 3 is located in the side of the front surface 40a of the sent-out aggregate 40, wherein the one protection-film-attached resin film 50 is sent out from the lower side of the roll to the one protection film peel-off mechanism 4 in such a way that the protection film 52 may be in the side of the sent-out aggregate 40.

In the same way, the other resin film send-out device 3 is located in the side of the back surface 40b of the sent-out aggregate 40, wherein the other protection-film-attached resin film 50 is sent out from the upper side of the roll to the other protection film peel-off mechanism 4 in such a way that the protection film 52 may be in the side of the sent-out aggregate 40.

The pair of the protection film peel-off mechanisms 4 and 4 are conversion rolls, each of which is located in the side of the front surface 40a and the side of the back surface 40b of the sent-out aggregate 40, respectively.

The one protection film peel-off mechanism 4 receives, onto the surface of the rotating conversion roll, the protection-film-attached resin film 50 which is sent out from the one resin film send-out device 3 toward the one protection film peel-off mechanism 4, wherein the one resin film 54 of the one protection-film-attached resin film 50 is made to progress toward the sheet heating and press-adhering device 6, while the one protection film 52 is made to progress toward the one protection film roll-up device 5, so that the one protection film 52 is peeled off from the one protection-film-attached resin film 50. In this way, the aggregate-side film surface 54a of the one resin film 54 is exposed.

In the same way, the other protection film peel-off mechanism 4 receives, onto the surface of the rotating conversion roll, the protection-film-attached resin film 50 which is sent out from the other resin film send-out device 3 toward the other protection film peel-off mechanism 4, wherein the other resin film 54 of the other protection-film-attached resin film 50 is made to progress toward the sheet heating and press-adhering device 6, while the other protection film 52 is made to progress toward the other protection film roll-up device 5, so that the other protection film 52 is peeled off from the other protection-film-attached resin film 50. In this way, the aggregate-side film surface 54a of the other resin film 54 is exposed.

Each of the pair of the protection film roll-up devices 5 and 5 is located in the side of the front surface 40a and the side of the back surface 40b of the sent-out aggregate 40, respectively, and rolls up the protection films 52 and 52 that are peeled off by the pair of the protection film peel-off mechanisms 4 and 4.

The sheet heating and press-adhering device 6 has a pair of the pressure rolls and a mechanism (not shown in the drawing) to impart a compression force to the pair of the pressure rolls. The pair of the pressure rolls has heating bodies inside thereof so as to heat with a prescribed set temperature.

The sheet heating and press-adhering device 6 forms the FRP precursor 60 in a form of a sheet by press-adhering the resin films 54 and 54 to the aggregate 40 that is entered thereto by means of the pair of the rotating pressure rolls (film pressing and adhering process) while sending-out the FRP precursor 60 toward the sheet pressing and cooling device 7. Specifically, the aggregate 40 which is sent out from the aggregate send-out device 2 and the resin films 54 and 54 which are sent out from the pair of the protection film peel-off mechanisms 4 and 4, respectively, enter into between the pair of the pressure rolls in such a way that the front surface 40a and the back surface 40b of the aggregate 40 which is sent out from the aggregate send-out device 2 may be laminated to each of the resin films 54 and 54 which is sent out from the pair of the protection film peel-off mechanisms 4 and 4, respectively.

At this time, the one resin film 54 is laminated to the aggregate 40 in such a way that the side of the aggregate-side film surface 54a of the one resin film 54 may be adhered to the side of the front surface 40a of the aggregate 40, and the other resin film 54 is laminated to the aggregate 40 in such a way that the side of the aggregate-side film surface 54a of the other resin film 54 may be adhered to the side of the back surface 40b of the aggregate 40; in this way, the FRP precursor 60 is formed. The FRP precursor 60 that is sent out from the sheet, heating and press-adhering device 6 is in a high temperature state.

The sheet pressing and cooling device 7 has a pair of the cooling and pressing rolls and a mechanism (not shown in the drawing) to impart a compression force to the pair of the cooling and pressing rolls. The pair of the cooling and pressing rolls compresses and cools the FRP precursor 60 in the high temperature state, which is sent out from the sheet heating and press-adhering device 6, by the pair of the rotating, cooling and pressing rolls, and then sends out this FRP precursor to the FRP precursor roll-up device 8.

The FRP precursor roll-up device 8 has a roll to roll up the FRP precursor 60 in a form of a sheet which is sent out from the sheet pressing and cooling device 7, as well as a driving mechanism to rotate the roll (not shown in the drawing).

The FRP precursor production device 1 described above is operated in the way as described below.

First, the aggregate 40 in a form of a sheet is sent out from the aggregate send-out device 2 toward the sheet heating and press-adhering device 6. At this time, both the front surface 40a and the back surface 40b of the aggregate 40 are exposed.

On the other hand, the one protection-film-attached resin film 50 is sent out from the lower side of the roll of the one resin film send-out device 3 toward the one protection film peel-off mechanism 4 in such a way that the protection film 52 may be in the side of the sent-out aggregate 40. The other protection-film-attached resin film 50 is sent out from the upper side of the roll of the other resin film send-out device 3 toward the other protection film peel-off mechanism 4 in such a way that the protection film 52 may be in the side of the sent-out aggregate 40.

Next, when the one protection-film-attached resin film 50 that is sent out changes the direction thereof upon reaching the conversion roll, i.e., the one protection film peel-off mechanism 4, the one protection film 52 is peeled off from the one protection-film-attached resin film 50 in such a way that the aggregate-side film surface 54a may be exposed, whereby the one resin film 54 is progressed toward the sheet heating and press-adhering device 6. In this way, the aggregate-side film surface 54a of the one resin film 54 is exposed. In the same way, when the other protection-film-attached resin film 50 that is sent out changes the direction thereof upon reaching the conversion roll, i.e., the other protection film peel-off mechanism 4, the other protection film 52 is peeled off from the other protection-film-attached resin film 50 in such a way that the aggregate-side film surface 54a may be exposed, whereby the other resin film 54 is progressed toward the sheet heating and press-adhering device 6. In this way, the aggregate-side film surface 54a of the other resin film 54 is exposed.

Each of the pair of the protection films 52 and 52 that are peeled off is rolled up by the pair of the protection film roll-up devices 5 and 5, respectively.

The aggregate 40 that is sent out from the aggregate send-out device 2 and the resin films 54 and 54 each of which is sent out from the pair of the protection film peel-off mechanisms 4 and 4, respectively, enter into the pair of the rolls in such a way that each of the resin films 54 and 54 may be laminated to the aggregate 40 that is sent out from the aggregate send-out device 2. Then, under a normal pressure, the pair of the resin films 54 and 54 is press-adhered to the aggregate 40 by means of the sheet heating and press-adhering device 6 to obtain the FRP precursor 60 (film press-adhering process). At this time, by controlling the temperature of the heating body inside the pair of the pressure rolls owned by the sheet heating and press-adhering device 6, the pair of the pressure rolls is kept at a prescribed temperature, and whereby it applies a pressure with heating so as to carry out the film pressing and adhering process.

Here, according to one aspect of the present invention, during the time that the resin film is press-adhered to the aggregate by heating, the temperature of the pressure roll is, in view of the resin filling property, preferably in the range of +5° C. to +35° C. relative to the temperature at which the minimum melt viscosity of the resin film is exhibited, more preferably in the range of +8° C. to +32° C. relative to the temperature at which the minimum melt viscosity of the resin film is exhibited, while far preferably in the range of +10° C. to +30° C. relative to the temperature at which the minimum melt viscosity of the resin film is exhibited. Here, the temperature at which the minimum melt viscosity of the resin film is exhibited is the value measured with a rheometer, more specifically, the value obtained by measurement with the method described in Examples. The roll linear pressure of the pressure roll under the condition that the pressure roll is at this temperature is, in view of the resin filling property, preferably in the range of 0.2 to 1.0 MPa, more preferably in the range of 0.4 to 1.0 MPa, while far preferably in the range of 0.4 to 0.6 MPa.

According to other aspect of the present invention, during the time that the resin film is press-adhered to the aggregate by heating, even in the case that the temperature of the pressure roll is less than +5° C. relative to the temperature at which the minimum melt viscosity of the resin film is exhibited, when the roll linear pressure of the pressure roll is in the range of 0.4 to 1.0 MPa, the resin filling property is satisfactory. The roll linear, pressure at this time may be any in the range of 0.4 to 0.8 MPa, in the range of 0.4 to 0.7 MPa, and in the range of 0.4 to 0.6 MPa.

In the present invention, the temperature at which the minimum melt viscosity of the resin film is exhibited is different depending on the material of the resin film; however, in view of productivity of the FRP precursor, the temperature is preferably in the range of 60 to 150° C., more preferably in the range of 80 to 140° C., far preferably in the range of 100 to 140° C., while particularly preferably in the range of 120 to 140° C.

The FRP precursor 60 which is sent out from the sheet heating and press-adhering device 6 is pressed further and cooled by the sheet pressing and cooling device 7.

The FRP precursor 60 which is sent out from the sheet pressing and cooling device 7 is rolled up by the FRP precursor roll-up device 8.

[Method for Producing FRP]

The present invention also provides a method for producing an FRP, the method including a process in which the FRP precursor obtained by the method for producing the FRP precursor is cured (made to a C-stage).

There is no particular restriction in the condition to cure the FRP precursor; preferably, the curing may be carried out by heating it at the temperature of 160 to 250° C. for the period of 15 to 60 minutes.

Here, in the case of producing the FRP for a printed wiring board, after metal foil is disposed either on one sheet of the FRP precursor or on a stack of 2 to 20 sheets of the FRP precursor, this may be molded while laminating under the conditions of the temperature of 100 to 250° C., the pressure of 0.2 to 10 MPa, and the heating period of 0.1 to 5 hours to form a laminate including the FRP. As described above, it is not absolutely necessary to cure the FRP precursor alone; the FRP precursor may be cured under the state that it is laminated with metal foil or with various resin films.

Hereinafter, the aggregate and the resin film to be used for production of the FRP precursor will be specifically explained.

[Aggregate]

As for the aggregate, heretofore known materials used in laminates for various electric insulating materials may be used. Illustrative examples of the aggregate material include natural fibers such as a paper and a cotton linter; inorganic fibers such as a glass fiber and asbestos; organic fibers such as aramid, polyimide, polyvinyl alcohol, polyester, tetrafluoroethylene, and acryl; and a mixture of them. Among them, in view of flame-retardance, a glass fiber is preferable. Illustrative examples of the material of the glass fiber include a woven fabric using the E glass, the C glass, the D glass, the S glass, or the like, or a glass woven fabric obtained by adhering short fibers thereof by means of an organic binder; and a mixed woven fabric of a glass fiber and a cellulose fiber. More preferable is the glass woven fabric using the E glass.

These aggregates are, for example, in the form of a woven fabric, a non-woven fabric, roving, a chopped strand mat, and a surfacing mat. Here, the material and the form thereof are selected in accordance with the use and the performance of the target molded article. They may be used singly, or as a mixture of two or more materials or forms as needed.

[Resin Film]

The resin film to be used in the production method of the present invention is a thermosetting resin film, which is obtained by shaping a thermosetting resin composition into a form of a film.

The thermosetting resin composition includes at least a thermosetting resin. Besides the thermosetting resin, as needed, it is preferable to include at least any one selected from a curing agent, a curing facilitator, an inorganic filler, an organic filler, a coupling agent, a leveling material, an antioxidant, a flame retardant, a flame retardant adjuvant, a thixotropic agent, a thickener, a thixotropy imparting agent, a flexible material, a surfactant, a photo-polymerization initiator, and the like.

Hereinafter, each component to be included in the thermosetting resin composition will be explained in order.

(Thermosetting Resin)

Illustrative examples of the thermosetting resin include an epoxy resin, a phenolic resin, an unsaturated imide resin, a cyanate resin, an isocyanate resin, a benzoxazine resin, an oxetane resin, an unsaturated polyester resin, an allyl resin, a dicyclopentadiene resin, a silicone resin, a triazine resin, a melamine resin, a urea resin, and a furan resin. The thermosetting resin is not limited particularly to these resins so that any heretofore known thermosetting resin may be used.

These may be used singly, or concurrently as a mixture of two or more of them. Among them, in view of workability, moldability, and production cost, an epoxy resin is preferable.

Illustrative examples of the epoxy resin include novolak epoxy resins such as a cresol novolak epoxy resin, a phenol novolak epoxy resin, a naphthol novolak epoxy resin, an aralkyl novolak epoxy resin, and a biphenyl novolak epoxy resin; bisphenol epoxy resins such as a bisphenol A epoxy resin, a bisphenol F epoxy resin, a bisphenol AD epoxy resin, a bisphenol S epoxy resin, a bisphenol T epoxy resin, a bisphenol Z epoxy resin, and a tetrabromobisphenol A epoxy resin; a biphenyl epoxy resin, a tetramethyl biphenyl epoxy resin, a triphenyl epoxy resin, a tetraphenyl epoxy resin, a naphthol aralkyl epoxy resin, naphthalenediol aralkyl epoxy resin, a naphthol aralkyl epoxy resin, a fluorene epoxy resin, an epoxy resin having a dicyclopentadiene skeleton, an epoxy resin having a skeleton of an ethylenic unsaturated group, and an alicyclic epoxy resin; a diglycidyl ether of a polyfunctional phenol; and hydrogenated compounds of these resins. These epoxy resins may be used singly, or in view of insulation reliability and heat resistance, concurrently as a mixture of two or more of them.

Illustrative examples of the commercially available epoxy resin include "EPICLON (registered trade name) N-660" (manufactured by DIC Corp), which is the cresol novolak epoxy resin; and "EPICLON (registered trade name) 840S" (manufactured by DIC Corp), "jER828EL", and "YL980" (both are manufactured by Mitsubishi Chemical Corp.), all of which are the bisphenol A epoxy resin.

There is no particular restriction in the epoxy resin. In view of imparting flexibility, the epoxy resin may be the one which has two or more epoxy groups in its molecule and also has in its main chain a structural unit derived from an alkylene glycol having 3 or more carbon atoms in the alkylene group therein. In view of further enhancement of the flexibility, two or more of the structural unit derived from the alkylene glycol having 3 or more carbon atoms in the alkylene group therein may be repeated continuously.

As for the alkylene glycol having 3 or more carbon atoms in the alkylene group therein, the alkylene glycol having 4 or more carbon atoms in the alkylene group therein is preferable. The upper limit of the number of the carbon atoms in the alkylene group is not particularly limited; but it is preferably 15 or less, more preferably 10 or less, while far preferably 8 or less.

In view of the flame retardance, a halogenated epoxy resin may be used as the epoxy resin.

(Curing Agent)

When the thermosetting resin is the epoxy resin, illustrative examples of the curing agent include the epoxy resin curing agents such as a phenolic curing agent, a cyanate ester curing agent, an acid anhydride curing agent, an amine curing agent, and a compound having an active eater group. Here, in the case where the thermosetting resin is a resin other than the epoxy resin, heretofore known curing agents for this thermosetting resin may be used. These curing agents may be used singly, or concurrently as a mixture of two or more of them, There is no particular restriction in the phenolic curing agent. Illustrative preferable examples thereof include a cresol novolak curing agent, a biphenyl curing agent, a phenol novolak curing agent, a naphthylene ether curing agent, and a phenolic curing agent having a triazine skeleton.

Illustrative examples of the commercially available phenolic curing agent include: cresol novolak curing agents such as KA-1160, KA-1163, and KA-1165 (all of them are manufactured by DIC Corp.); biphenyl curing agents such as MEH-7700, MEH-7810, and MEH-7851 (all of them are manufactured by Meiwa Plastic Industries Ltd.); phenol novolak curing agents such as Phenohte (registered trade mark) TD2090 (manufactured by DIC Corp.); naphthylene ether curing agents such as EXB-6000 (manufactured by DIC Corp.); and phenolic curing agents having a triazine skeleton such as LA3018, LA7052, LA7054, and LA1356 (all of them are manufactured by DIC Corp.), Among these, the cresol novolak curing agents are preferable.

There is no particular restriction in the cyanate ester curing agent. Illustrative examples thereof include bisphenol A dicyanate, polyphenol cyanate(oligo(3-methylene-1,5-phenylene cyanate), 4,4'-methylenebis(2,6-dimethylphenylcyanate), 4,4'-ethylidenediphneyl dicyanate, hexatluorobispheriol A dicyanate, 2,2-bis(4-cyanate)phenyl propane, 1,1-bis(4-cyanatephenylmethane), bis(4-cyanate-3,5-dimethylphenyl)methane, 1,3-bis(4-cyanatephenyl-1-(methylethylidene)benzene, bis(4-cyanatephenyl)thioether, and bis(4-cyanatephenyl)ether.

There is no particular restriction in the acid anhydride curing agent. Illustrative examples thereof include phthalic anhydride, tetrahydrophthalic anhydride, hexahydrophthalic anhydride, methyl tetrahydrophthalic anhydride, methyl hexahydrophthalic anhydride, methyl nadic anhydride, hydrogenated methyl nadic anhydride, trialkyl tetrahydrophthalic anhydride, dodecenyl succinic anhydride, 5-(2,5-dioxotetrahydro-3-furanyl)-3-methyl-3-cyclohexene-1,2-dicarboxylic acid anhydride, trimellitic anhydride, and pyromellitic anhydride.

There is no particular restriction in the amine curing agent. Illustrative examples thereof include aliphatic amines such as triethylene tetramine, tetraethylene pentamine, and diethylamino propylamine; and aromatic amines such as m-phenylene diamine and 4,4'-diamino diphenyl methane.

In addition, a urea resin and the like may be used as the curing agent.

When the thermosetting resin composition includes the curing agent, the content thereof relative to 100 parts by mass of the thermosetting resin is preferably in the range of 20 to 150 parts by mass, more preferably in the range of 20 to 100 parts by mass, while far preferably in the range of 40 to 100 parts by mass.

Here, amount of the epoxy resin curing agent to be blended is preferably in the range of 0.3 to 1.5 equivalents as the equivalent ratio of the curing agent's reactive group relative to 1 epoxy equivalent of the epoxy resin. When the blended amount of the epoxy resin curing agent is within the above-mentioned range, the cure degree can be readily controlled, so that the productivity can be enhanced.

(Curing Facilitator)

As for the curing facilitator, general curing facilitators that are used for curing the afore-mentioned thermosetting resin may be used. For example, when the thermosetting resin is the epoxy resin, illustrative examples of the curing facilitator include imidazole compounds and derivatives thereof phosphorous compounds; tertiary amine compounds; and quaternary ammonium compounds. In view of facilitation of the curing reaction, the imidazole compounds and derivatives thereof are preferable.

Specific examples of the imidazole compound and derivative thereof include imidazole compounds such as 2-methylimidazole, 2-ethylimidazole, 2-undecylimidazole, 2-heptadecylimidazole, 2-phenylimidazole, 1,2-dimethylimidazole, 2-ethyl-1-methylimidazole, 1,2-diethylimidazole, 1-ethyl-2-methylimidazole, 2-ethyl-4- methylimidazole, 4-ethyl-2-methylimidazole, 1-isobutyl-2-methylimidazole, 2-phenyl-4-methylimidazole, 1-benzyl-2-phenylimidazole, 1-cyanoethyl-2-methylimidazole, 1-cyanoethyl-2-ethylimidazole, 1-cyanoethyl-2-phenylimidazole, 1-cyanoethyl-2-ethyl-4-methylimidazole, 2-phenyl-4,5-dihydroxymethylimidazole, 2-phenyl-4-methyl-5-hydroxymethylimidazole, 2,3-dihydro-1H-pyrro[1,2-a]benzimidazole, 2,4-diamino-6-[2'-methylimidazolyl-(1')]ethyl-s-triazine, 2,4-diamino-6-[2'-undecylimidazolyl-(1')]ethyl-s-triazine, and 2,4-diamino-6-[2'-ethyl-4'-methylimidazolyl-(1')]ethyl-s-triazine; modified imidazole compounds such as an isocyanate-masked imidazole and an epoxy-masked imidazole; salts of the above-mentioned imidazole compounds with trimellitic acid such as 1-cyanoethyl-2-phenylimidazolium trimellitate; salts of the above-mentioned imidazole compounds with isocyanuric acid; and salts of the above-mentioned imidazole compounds with hydrogen bromide. Among these, the modified imidazole compounds are preferable, while the isocyanate-masked imidazole is more preferable. The imidazole compounds may be used singly, or concurrently as a mixture of two or more of them.

When the thermosetting resin composition includes the curing facilitator, the content thereof relative to 100 parts by mass of the thermosetting resin is, in view of storage stability and physical properties of the thermosetting resin composition, preferably in the range of 0.1 to 20 parts by mass, more preferably in the range of 0.1 to 10 parts by mass, while far preferably in the range of 0.5 to 6 parts by mass.

(Inorganic Filler)

Owing to the inorganic filler, the non-transmitting property and the abrasion resistance can be enhanced, as well as the thermal expansion rate can be lowered.

Illustrative examples of the inorganic filler include oxides such as silica, aluminum oxide, zirconia, mullite, and magnesia; hydroxides such as aluminum hydroxide, magnesium hydroxide, and hydrotalcite; nitride ceramics such as aluminum nitride, silicon nitride, and boron nitride; natural minerals such as talc, montmorillonite, and saponite; and metal particles and carbon particles. Among these, oxides and hydroxides are preferable; silica and aluminum hydroxide are more preferable; and aluminum hydroxide is far preferable.

Then the thermosetting resin composition includes the inorganic filler, the content thereof in the solid portion of the thermosetting resin composition is preferably in the range of 0.1 to 65% by volume, though the content is different depending on the purpose of the addition. For the purposes of coloring and non-transmitting property, when the amount thereof is 0.1% or more by volume, sufficient effects is prone to be expressed. On the other hand, in the case that the addition is made for the purpose to increase the volume, when the amount thereof is limited to 65% or less by volume, not only a decrease in the adhesion strength is prone to be suppressed, but also an excessive increase in the viscosity at the time of blending of the resins can be avoided so that deterioration of the workability is prone to be readily suppressed. From the same viewpoints, the content of the inorganic filler is more preferably in the range of 5 to 50% by volume, while far preferably in the range of 10 to 40% by volume.

It must be noted here that the solid portion in this specification means the components other than volatile substances such as water and an organic solvent to be mentioned later in the composition. In other words, the solid portion includes those that are, at room temperature around 25° C., in a liquid state, a syrup state, and a waxy state; and therefore, this does not necessarily mean it is in a solid state.

(Coupling Agent)

When the coupling agent is included therein, not only dispersion of the inorganic filler and the organic filler can be improved but also adhesion to the reinforcing material can be improved. The coupling agent may be used singly, or concurrently as a mixture of two or more thereof.

As for the coupling agent, a silane coupling agent is preferable. Illustrative examples of the silane coupling agent include aminosilane coupling agents [for example, 3-aminopropyl trimethoxy silane and N-(2-aminoethyl)-3-aminopropyl triethoxy silane], epoxysilane coupling agents [for example, 3-glycidoxypropyl trimethoxy silane and 2-(3,4-epoxycyclohexyl)ethyl trimethoxy silane], phenylsilane coupling agents, alkylsilane coupling agents, alkenylsilane coupling agents [for example, vinylsilane coupling agents such as vinyl trichlorosilane and vinyl triethoxy silane], alkynylsilane coupling agents, haloalkylsilane coupling agents, siloxane coupling agents, hydrosilane coupling agents, silazane coupling agents, alkoxysilane coupling agents, chlorosilane coupling agents, (meth)acrylsilane coupling agents, aminosilane coupling agents, isocyanurate silane coupling agents, ureidosilane coupling agents, mercaptosilane coupling agents, sulfidesilane coupling agents, and isocyanate silane coupling agents. Among these, the epoxysilane coupling agents are preferable, while 3-glycidoxypropyl trimethoxy silane is more preferable.

Also, a so-called titanate coupling agent, which is the one having the silane portion thereof substituted with a titanate group, may be used.

When the thermosetting resin composition includes the coupling agent, the content thereof relative to 100 parts by mass of the thermosetting resin is preferably in the range of 0.1 to 5 parts by mass, more preferably in the range of 0.1 to 4 parts by mass, while far preferably in the range of 0.5 to 3 parts by mass. When the content is 0.01 or more by mass, the surface of the aggregate and the surface of the filler are prone to be sufficiently covered; when the content is 5 or less by mass, generation of excess coupling agent is prone to be suppressed.

(Organic Solvent)

From a viewpoint to improve handling property, an organic solvent may be further included in the resin composition. In this specification, the resin composition including an organic solvent is sometimes called a resin varnish. At the time to form the resin film, in view of workability, the resin composition is preferably used as the resin varnish.

There is no particular restriction in the organic solvent. Illustrative examples thereof include: alcoholic solvents such as methanol, ethanol, propanol, butanol, methyl cellosolve, butyl cellosolve, propylene glycol monomethyl ether, ethylene glycol monoethyl ether, dipropylene glycol monomethyl ether, dipropylene glycol monoethyl ether, and tripropylene glycol monomethyl ether; ketone solvents such as acetone, methyl ethyl ketone, methyl isobutyl ketone, butanone, cyclohexanone, and 4-methyl-2-pentanone; ester solvents such as ethyl acetate, butyl acetate, and propylene glycol monomethyl ether acetate; ether solvents such as tetrahydrofuran; aromatic solvents such as toluene, xylene, and mesitylene; nitrogen atom containing solvents such as N,N-dimethylformamide, N,N-dimethylacetamide, and N-methylpyrrolidone; and sulfur atom containing solvents such as dimethyl sulfoxide. Among these, in view of solubilizing property and appearance after coating, ketone solvents are preferable; cyclohexanone, methyl ethyl ketone, and methyl isobutyl ketone are more preferable; and cyclohexanone and methyl ethyl ketone are far preferable.

These organic solvents may be used singly, or concurrently as a mixture of two or more of them.

In view of easy application, content of the organic solvent is controlled, for example, in such a manner that the solid portion of the resin composition may be in the range of 20 to 85% by mass, while more preferably in the range of 40 to 80% by mass.

(Method for Producing the Thermosetting Resin Film)

First, after the thermosetting resin and, as needed, other components are added into the solvent, they are mixed and stirred by using various mixing machines to obtain the resin varnish. Illustrative examples of the type of the mixing machine include an ultrasonic dispersion type, a high-pressure collision dispersion type, a high-speed rotation dispersion type, a bead mill type, a high-speed shearing dispersion type, and a planetary centrifugal dispersion type. The resin varnish thus obtained is applied to a carrier film; and then, after an unnecessary organic solvent is removed, the varnish is semi-cured (made to the B-stage) to obtain the thermosetting resin film (resin film).

Illustrative examples of the carrier film include films of organic substances such as polyethylene terephthalate (PET), biaxially oriented polypropylene (OPP), polyethylene, polyvinyl fluorate, and polyimide; films of copper or aluminum, as well as alloy films of these metals; and these organic films or metal films whose surfaces are subjected to a release treatment by a release agent.

At the time that the resin film thus obtained is rolled up by a roller, when the carrier film is disposed to the semi-cured surface that is formed by applying the thermosetting resin composition and thereby the carrier film is rolled up in the state of interposing the thermosetting resin composition, the workability is so good that this way is preferable.

There is no particular restriction in thickness of the resin film. When the resin film thinner than the thickness of the aggregate is used, two or more sheets of the resin film may be adhered to one surface of the aggregate. When two or more sheets of the resin film are used, resin films having different thermal cure degrees, or compositions having different formulation, or the like may be combined and used.

The FRP precursor may be thermally cured after it is cut to an arbitrary size as needed and adhered to a prescribed material as needed. The FRP precursor may be used by roll-to-roll after it is previously rolled up to a roll.

EXAMPLES

Next, the present invention will be explained in more detail by Examples described below; however, these Examples do not limit the present invention.

The resin filling property of the FRP precursor obtained in Examples was measured by the method described below.

(1. Resin Filling Property)

The surface picture of the FRP precursor attached with a supporting body after lamination was observed and photographed by means of an optical microscope with an arbitrary magnification; and then, the areas of the resin-filled portion and of the resin-unfilled portion were calculated. From the area rate of the resin-filled portion, the resin filing property was assessed according to the assessment criteria described below. The assessment A is the highest in the resin filling property, and the assessment D is poor in the resin filling property. Assessments equal to or above the assessment C are preferable, while the assessment B or the assessment A is more preferable.

A: The resin filling rate is 95% or more.
B: The resin filling rate is 90% or more and less than 95%.
C: The resin filling rate is 85% or more and less than 90%.
D: The resin filling rate is less than 85%.

[Production Example 1] Production of the Resin Film 1

(Preparation of the Thermosetting Resin Varnish 1)

To 100 parts by mass of a cresol novolak epoxy resin "EPICLON (registered trade mark) N-660" (manufactured by DIC Corp.) and 60 parts by mass of a cresol novolak resin "Phenolite (registered trade mark) KA-1165" (manufactured by DIC Corp.) were added 15 parts by mass of cyclohexanone and 130 parts by mass of methyl ethyl ketone; and then, the resulting mixture was thoroughly stirred for dissolution. To this were added 180 parts by mass of aluminum hydroxide "CL-303" (manufactured by Sumitomo Chemical Co., Ltd.), 1 part by mass of a coupling agent "A-187" (manufactured by Momentive Performance Materials, Inc.), and 2.5 parts by mass of an isocyanate-masked imidazole "G8009L" (curing facilitator, manufactured by DKS Co., Ltd.); and then, the resulting mixture was stirred for dissolution and dispersion to prepare the thermosetting resin varnish 1 with the solid portion of 70% by mass.

(Production of the Resin Film 1)

The thermosetting resin varnish 1 thus obtained was applied to a PET film (G-2, manufactured by Teijin DuPont Films Japan Ltd.) having the width of 580 mm so as to give the application width of 540 mm and the thickness after drying of 15 μm, which was then followed by drying at 100° C. for 3 minutes to prepare the resin film 1. When the minimum melt viscosity temperature of the resin film 1 thus prepared was measured by using a rheometer "AR-200ex" (jig of 20 mmφ, manufactured by TA Instruments Japan Inc.) with the temperature raising rate of 3° C./minute, the minimum melt viscosity temperature thereof was 130° C.

[Examples 1 to 7 and Comparative Examples 1 to 6] Production of the FRP Precursor The resin films 1 prepared in Production Example 1 were put on both sides of a glass woven fabric (weight: 12.5 g/m$^2$, IPC #1017, substrate width: 550 mm, manufactured by Nitto Boseki Co., Ltd.) as the aggregate; and the thermosetting resin was press-impregnated into the aggregate by interposing by means of a heating and pressing roll under the conditions described in Table 1 or Table 2. Then, this was cooled by a cooling roll, and then rolled up to prepare the FRP precursor. By using the FRP precursor thus obtained, the resin filling property was assessed. The results are summarized in Table 1 and Table 2.

TABLE 1

| | | Example | | | | | | |
|---|---|---|---|---|---|---|---|---|
| | | 1 | 2 | 3 | 4 | 5 | 6 | 7 |
| Heating and pressing conditions | Roll linear pressure (MPa) | 0.4 | 0.5 | 0.6 | 0.3 | 0.3 | 0.3 | 0.6 |
| | Roll temperature (° C.) | 130 | 130 | 130 | 140 | 150 | 160 | 160 |
| | Difference from minimum melt viscosity exhibiting temperature | 0° C. | 0° C. | 0° C. | +10° C. | +20° C. | +30° C. | +30° C. |
| | Result (resin filling property) | C | C | B | C | C | B | A |

TABLE 2

| | | Comparative Example | | | | | |
|---|---|---|---|---|---|---|---|
| | | 1 | 2 | 3 | 4 | 5 | 6 |
| Heating and pressing conditions | Roll linear pressure (MPa) | 0.1 | 0.2 | 0.3 | 0.3 | 0.3 | 0.3 |
| | Roll temperature (° C.) | 130 | 130 | 130 | 110 | 120 | 130 |
| | Difference from minimum melt viscosity exhibiting temperature | 0° C. | 0° C. | 0° C. | −20° C. | −10° C. | 0° C. |
| | Result (resin filling property) | D | D | D | D | D | D |

From Table 1, the FRP precursors obtained in Examples had excellent resin filling property into bulk voids of the aggregate; and the resin filling property could be further enhanced by combining the conditions. On the other hand, from Table 2, none of the FRP precursors obtained in Comparative Examples had good resin filling property.

Therefore, according to the production method of the present invention, the FRP precursor having excellent resin filling property can be obtained.

REFERENCE SIGNS LIST

1 FRP precursor production device
2 Aggregate send-out device
3 Resin film send-out device
4 Protection film peel-off mechanism
5 Protection film roll-up device
6 Sheet heating and press-adhering device (film press-adhering means)
7 Sheet pressing and cooling device
8 FRP precursor roll-up device
40 Aggregate
40a Aggregate's front surface (one aggregate's surface; one surface of both aggregate's surfaces)
40b Aggregate's back surface (another aggregate's surface; another surface of both aggregate's surfaces)
50 Protection-film-attached resin film
52 Protection film
54 Resin film (film)
54a Aggregate-side resin film surface (aggregate-side film surface)
60 FRP precursor

The invention claimed is:

1. A method for producing an FRP precursor, comprising: providing an aggregate that is in a form of a sheet, and heating and press-adhering a thermosetting resin film to a surface of the aggregate by pressing the thermosetting resin film to the surface of the aggregate with a pressure roll at a roll pressure in a range of 0.5 to 1.0 MPa, wherein the pressure roll has a temperature in a range of +30° C. to +35° C. relative to a temperature at which a minimum melt viscosity of the thermosetting resin film is exhibited, wherein the heating and press-adhering are conducted while the aggregate, the thermosetting resin film and the pressure roll are under an atmospheric pressure.

2. A method for producing an FRP, comprising:
providing an aggregate that is in a form of a sheet,
heating and press-adhering a thermosetting resin film to a surface of the aggregate by pressing the thermosetting resin film to the surface of the aggregate with a pressure roll at a roll pressure in a range of 0.5 to 1.0 MPa, wherein the pressure roll has a temperature in a range of +30° C. to +35° C. relative to a temperature at which a minimum melt viscosity of the thermosetting resin film is exhibited to form an FRP precursor, wherein the heating and press-adhering are conducted while the aggregate, the thermosetting resin film and the pressure roll are under an atmospheric pressure; and
curing the FRP precursor.

3. A method for producing an FRP precursor, comprising:
providing an aggregate that is in a form of a sheet, and
heating and press-adhering thermosetting resin films to each of opposing surfaces of the aggregate by pressing each of the thermosetting resin films to each of the opposing surfaces of the aggregate with pressure rolls at a roll pressure in a range of 0.5 to 1.0 MPa, wherein the pressure rolls have a temperature in a range of +30° C. to +35° C. relative to temperature at which a minimum melt viscosity of the thermosetting resin films is exhibited, wherein the heating and press-adhering are conducted while the aggregate, the thermosetting resin films and the pressure rolls are under an atmospheric pressure.

4. A method for producing an FRP, comprising:
providing an aggregate that is in a form of a sheet, and
heating and press-adhering thermosetting resin films to each of opposing surfaces of the aggregate by pressing each of the thermosetting resin films to each of the opposing surfaces of the aggregate with pressure rolls at a roll pressure in a range of 0.5 to 1.0 MPa, wherein the pressure rolls have a temperature in a range of +30°

C. to +35° C. relative to the temperature at which a minimum melt viscosity of the thermosetting resin films is exhibited, wherein the heating and press-adhering are conducted while the aggregate, the thermosetting resin films and the pressure rolls are under an atmospheric pressure to form an FRP precursor; and curing the FRP precursor.

* * * * *